(12) United States Patent
Liu et al.

(10) Patent No.: US 12,003,154 B2
(45) Date of Patent: Jun. 4, 2024

(54) ARTICLES INCLUDING INSULATED CONDUCTORS AND SYSTEMS THEREOF

(71) Applicant: GENERAL ELECTRIC COMPANY, Schenectady, NY (US)

(72) Inventors: Jie Jerry Liu, Niskayuna, NY (US); Anil Raj Duggal, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/583,719

(22) Filed: Jan. 25, 2022

(65) Prior Publication Data
US 2022/0149688 A1 May 12, 2022

Related U.S. Application Data

(63) Continuation of application No. 16/167,534, filed on Oct. 23, 2018, now Pat. No. 11,258,325.

(51) Int. Cl.
*H02K 3/34* (2006.01)
*H02K 3/02* (2006.01)
*H02K 3/24* (2006.01)
*H02K 3/30* (2006.01)
*H02K 9/00* (2006.01)

(52) U.S. Cl.
CPC ............... *H02K 3/34* (2013.01); *H02K 3/02* (2013.01); *H02K 3/24* (2013.01); *H02K 3/30* (2013.01); *H02K 9/00* (2013.01)

(58) Field of Classification Search
CPC .. H02K 3/34; H02K 3/02; H02K 3/24; H02K 3/30
See application file for complete search history.

(56) References Cited

U.S. PATENT DOCUMENTS

| | | | |
|---|---|---|---|
| 3,043,901 A | 7/1962 | Gerwing et al. | |
| 3,949,154 A | 4/1976 | Rasquin | |
| 5,173,442 A | 12/1992 | Carey | |
| 5,346,749 A | 9/1994 | Bettinelli | |
| 5,468,557 A | 11/1995 | Nishio et al. | |
| 5,659,944 A * | 8/1997 | Thiard-Laforet | H02K 3/505 228/165 |
| 6,242,825 B1 | 6/2001 | Mori et al. | |

(Continued)

FOREIGN PATENT DOCUMENTS

| | | |
|---|---|---|
| CN | 201774334 U | 3/2011 |
| CN | 102447331 A | 5/2012 |

(Continued)

OTHER PUBLICATIONS

Grise et al., "Coupled finite element analysis of super heat resistant ceramic insulated wire", Proceedings: Electrical Insulation Conference and Electrical Manufacturing and Coil Winding Conference, Rosemont, USA, pp. 219-227, Sep. 25, 1997.

(Continued)

*Primary Examiner* — Bernard Rojas
(74) *Attorney, Agent, or Firm* — McGarry Bair PC

(57) ABSTRACT

An article can include a ceramic insulator with an interior surface defining a recess, an insulator aperture in the interior surface, and an insulator cooling channel extending through at least a portion of the ceramic insulator to the insulator aperture. A first conductor can be at least partially disposed within the recess.

20 Claims, 15 Drawing Sheets

(56) References Cited

U.S. PATENT DOCUMENTS

| | | | |
|---|---|---|---|
| 6,815,012 | B2 | 11/2004 | Baumann et al. |
| 7,081,586 | B2 | 7/2006 | Rehrig |
| 7,211,766 | B2 | 5/2007 | Rehrig |
| 7,655,868 | B2 | 2/2010 | Sheaffer et al. |
| 7,804,385 | B2 | 9/2010 | Snyder |
| 7,892,597 | B2 | 2/2011 | Hooker et al. |
| 7,969,049 | B2 | 6/2011 | Laskaris et al. |
| 8,030,818 | B2 | 10/2011 | Nelson et al. |
| 8,125,763 | B2 | 2/2012 | Kobayashi et al. |
| 8,257,112 | B2 | 9/2012 | Tilley |
| 8,627,868 | B2 | 1/2014 | Guercioni |
| 9,048,653 | B2 | 6/2015 | D'Angelo, III et al. |
| 9,071,028 | B2 | 6/2015 | Falk et al. |
| 9,356,410 | B2 | 5/2016 | Adcock et al. |
| 9,824,794 | B1 | 11/2017 | McNutt et al. |
| 2004/0146289 | A1 | 7/2004 | Sakamoto et al. |
| 2004/0226514 | A1* | 11/2004 | Mahon ............ H01J 37/32559 118/728 |
| 2005/0108875 | A1* | 5/2005 | Mathieu ............ G01R 1/06711 29/852 |
| 2014/0035426 | A1 | 2/2014 | Perry et al. |
| 2017/0047803 | A1 | 2/2017 | Scherer et al. |
| 2017/0126084 | A1* | 5/2017 | Schweinert ............ H02K 3/22 |
| 2018/0301244 | A1 | 10/2018 | Calabrese et al. |
| 2019/0109513 | A1 | 4/2019 | Bethge |
| 2019/0222087 | A1 | 7/2019 | Matsumoto et al. |
| 2019/0334397 | A1 | 10/2019 | Kaji et al. |
| 2020/0169152 | A1 | 5/2020 | Matsumoto et al. |
| 2020/0204028 | A1 | 7/2020 | Mizushima et al. |

FOREIGN PATENT DOCUMENTS

| | | |
|---|---|---|
| WO | 2015150556 A1 | 10/2015 |
| WO | 2016087029 A1 | 6/2016 |
| WO | 2019230058 A1 | 12/2019 |

OTHER PUBLICATIONS

Feng et al., "Study on the optimization design of flow channels and heat dissipation performance of liquid cooling modules", 2009 International Conference on Mechatronics and Automation, Changchun, China, pp. 3145-3149, Aug. 9-12, 2009.

Wang et al., "Low temperature co-fired ceramics (LTCC) for the insulation coating of high temperature electrical conductors", 2015 IEEE Electrical Insulation Conference (EIC), Seattle, USA, pp. 559-563, Jun. 7-10, 2015.

Liu et al., "Design of high thermal conductivity insulation adhesive (H-class) for low voltage motor", IEEE Transactions on Dielectrics and Electrical Insulation, vol. 23, Issue: 4, pp. 1907-1914, Sep. 8, 2016.

Calebrese et al., "Systems and methods for a conductor disposed within an insulator", Pending U.S. Appl. No. 15/489,443, filed Apr. 17, 2017, 17 Pages.

Annotated Machine Translation of Kobuchi (WO2019230058A1), 2019 (Year 2019).

* cited by examiner

ARTICLES INCLUDING INSULATED CONDUCTORS AND SYSTEMS THEREOF

CROSS-REFERENCE TO RELATED APPLICATIONS

This application is a continuation of U.S. patent application Ser. No. 16/167,534, filed Oct. 23, 2018, now U.S. Pat. No. 11,258,325, issued Feb. 22, 2022, which is incorporated herein by reference in its entirety.

BACKGROUND

The subject matter disclosed herein relates to insulated conductors for electric machines, and more specifically, to articles including insulated conductors for use in components, for example windings of electric machines.

Electric machines (e.g., generators and motors) may be used to convert mechanical energy into electrical energy, or vice versa. Electric machines typically include a plurality of conductors bound together (e.g., a winding) and routed along a path throughout the electric machine, resulting in a plurality of windings disposed circumferentially within the electric machine. Typically, each winding is formed by bundling or braiding a plurality of individually insulated conductors, wrapping the bundle in an insulator for example polymeric tape, mica tape or mica paper (i.e., turn insulation), and wrapping a group of insulated conductor bundles in polymeric tape or mica tape (ground wall insulation). However, such techniques may result in cracks, wrinkles, or other voids that includes pockets of air. If a voltage stress across the void exceeds a corona inception voltage for the gas within the void, partial discharge will occur within the void. Partial discharge may degrade the insulator around the void, creating paths that may lead to electrical or structural failure of the insulator. Additionally, the thermal conductivity of commonly used mica tape insulators is around 0.2 to 0.3 W/mK, which is lower than desired, preventing the windings from dissipating heat at a desirable rate. Therefore, there is a need for alternative insulator and methods that provide reliable insulation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
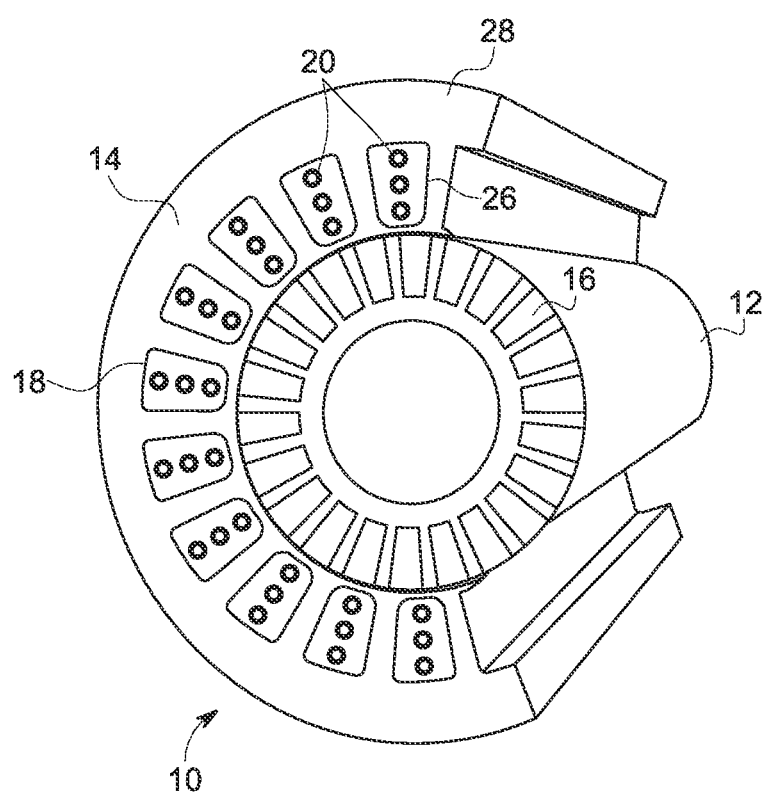
FIG. 1 is a cut-away view of an electric machine, in accordance with one embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, the term "conductor" refers to an element that is configured to conduct electric currents. In some embodiments, a conductor refers to a segment of a winding generally used in a component (stator or rotor) of an electric machine. A segment may include a single strand, or multiple strands (for example, a bundle of strands) assembled together such as litz wire. A winding may include a plurality of conductors.

As used herein, the term "ceramic insulator" refers to an element made of a ceramic material that has an electrical resistivity higher than $1\times10^8$ (ohm m) at a desired operating temperature (for example, between 100 degrees Celsius and 500 degrees Celsius).

The presently disclosed articles relate to insulated conductors, which may include a plurality of conductors extending through one or more ceramic insulators. These insulated conductors may be used in a variety of electrical components for example, windings of electric machine. Some embodiments are directed to an article that includes one or more ceramic insulators having one or more recesses and a plurality of conductors disposed in the one or more recesses of the one or more ceramic insulators where the first conductor of the plurality of conductors is joined to a second conductor of the plurality of conductors. In some embodiments, the exterior surfaces of the plurality of conductors conform to the interior surfaces of the one or more ceramic insulators.

In some embodiments, a method for forming an article includes providing one or more ceramic insulators having one or more recesses, providing a plurality of conductors within the one or more recesses of the one or more ceramic insulators and joining a first conductor of the plurality of conductors to a second conductor of the plurality of conductors. In some embodiments, the method further includes joining a first ceramic insulator to a second ceramic insulator of the one or more ceramic insulators after providing the plurality of conductors within the one or more recesses. In some embodiments, the step of joining the first ceramic insulator to the second ceramic insulator is performed at a temperature in a range from about 200 degrees Celsius to about 800 degrees Celsius.

As used herein, the term "providing a conductor" or "providing a plurality of conductors" or "a conductor is disposed" refers to providing or disposing or inserting at least a portion of the conductor or at least a portion of each conductor of the plurality of conductors within the one or more recesses, throughout the specification unless indicated otherwise.

The plurality of conductors may include a metal or a metal alloy having high electrical conductivity (for example, higher than $3.4\times10^7$ Siemens/meter). In some embodiments, the plurality of conductors includes a metal selected from the group consisting of copper, silver, gold, aluminum and combinations thereof. Examples of the metal alloys for the plurality of conductors include, but are not limited to, nickel plated copper, silver plated copper or aluminum plated copper. Each conductor of the plurality of conductors may have a cross section of any shape for example, polygonal, circular, oval or star shape. In some embodiments, it may be beneficial to have soft edges with smooth transitions. Accordingly, in some embodiments, the cross sectional shape of each conductor may be a lobed polygon having any number of sides. In some embodiments, the cross-sectional shape of at least one conductor of the plurality of conductors varies along a length of the conductor. The plurality of conductors may be solid or have at least a hollow portion of any desirable shape and size. The plurality of conductors may be formed by a suitable technique for example, sintering, extrusion, casting, pressing, spraying, 3D printing, or may be procured preformed. In some instances, at least a conductor of the plurality of conductors may be formed within the one or more recesses of the one or more ceramic insulators by a suitable technique for example, electroplating, electroless plating, 3D printing, pouring molten material into a recess or some other process.

In some embodiments, a conductor of the plurality of conductors may occupy less than the entire cross section of its respective recess of the one or more ceramic insulator and define a cooling channel. The article may include one or more cooling channels. In some instances, at least one conductor of the plurality of conductors defines a cooling channel through the at least one conductor. In some other embodiments, a cooling channel of the one or more cooling channels has a cross section more than that of a conductor of the plurality of conductors, disposed in the corresponding recess and the conductor may be disposed within the cooling channel. In these instances, the cross section of the cooling channel may match with the cross section of the corresponding recess. The size of a conductor and the size of a cooling channel disposed in a recess of the one or more recesses may be dimensioned to take advantage of "skin effects" at the working frequency ranges for an electric machine. In some embodiments, at least one conductor of the plurality of conductors occupies the entire cross section of the recess in which it is disposed. In these embodiments, a cooling channel may be defined in a separate recess (that does not comprise a conductor) in the one or more ceramic insulators. In embodiments where the article includes more than one cooling channels, the cooling channels are in fluid communication.

A coolant fluid may be disposed in the one or more cooling channels in order to dissipate heat generated for desired thermal management in electrical components, for example windings. The coolant fluid draws heat from the plurality of conductors, allowing the plurality of conductors to conduct more electric current, which would not be possible without the temperature of the plurality of conductors increasing. The coolant fluid may flow through the one or more cooling channels, or the coolant fluid may remain stationary (e.g., as in a heat pipe). In some embodiments, the cross sectional shape of a cooling channel of the one or more cooling channels may vary along its length in order to generate turbulent flows in the coolant fluid and increase heat dissipation from the plurality of conductors. In some embodiments, the cross sectional shape of the cooling channel may vary without causing any corresponding change in the cross sectional area of the cooling channel and/or the conductor.

The one or more ceramic insulators include a ceramic material having high electrical resistivity (for example, higher than $1 \times 10^8$(ohm m). In some embodiments, the ceramic material has no porosity or a low porosity for example less than 1%, in order to minimize voids in the one or more ceramic insulators and reduce instances of partial discharge during operation and maintain high dielectric strength. In some embodiments, the ceramic material may be a corona-proof or corona resistant ceramic material, which may reduce partial discharge damage during operation. The thermal conductivity of the ceramic material may be high to dissipate heat. For instance, dense alumina and zirconia have a thermal conductivity of 30 W/mk and 3 W/mk respectively, in contrast to 0.2-0.3 W/mk for the commonly used polymeric insulation materials and mica tapes. Suitable examples of the ceramic materials include alumina, zirconia, mullite or a combination thereof. The one or more ceramic insulators may be made of same or different ceramic materials as disclosed herein and any suitable geometry and size. Use of ceramic materials as an insulator for a conductor in the windings may increase thermal conductivity by 100 times or more and increase operating temperatures by 200 degrees Celsius or more as compared to that of a conventional insulator.

The one or more ceramic insulators may be formed in a variety of ways or procured preformed. In some embodiments, the one or more ceramic insulators may be formed using a suitable manufacturing technique for example, sintering, extrusion, casting (e.g., tape cast, slip cast, shell cast, etc.), molding, pressing, 3D printing or so forth. In some embodiments, the one or more ceramic insulators may go through a pre-sintering process at any point after the one or more ceramic insulators have been formed. In some embodiments, the one or more ceramic insulators have a monolith structure. As used herein, the term "monolith structure" refers to a single piece of material without any joining. In some embodiment, the manufacturing technique for example, 3D printing allows the formation of monolithic structures of complex shapes.

FIG. 1 is a cut-away view of one embodiment of a system for example, an electric machine 10 (e.g., an electric motor or a generator). The electric machine 10 includes a rotor 12 that rotates within a stator 14. The rotor 12 may include a plurality of magnets 16. The stator 14 has a stator body 28 comprising a magnetic material and windings 18 disposed circumferentially about the rotor 12. The stator body 28 may be disposed on the windings 18. In some embodiments, the rotor 12 may include a plurality of windings in place of the plurality of magnets 16 i.e., both the rotor 12 and the stator 14 have windings. For generators, as the rotor 12 rotates within the stator 14, a voltage is created by way of magnetic induction, thus converting mechanical energy into electrical energy. For motors, electric currents through the windings 18 create magnetic fields that cause the rotor 12 to rotate within the stator 14. It should be understood, however, that in some embodiments the placement of the magnets 16 and windings 18 may be reversed. That is, in some embodiments the windings 18 may be a part of the rotor 12 and the magnets 16 may be part of the stator 14. Each winding 18 includes one or more insulated conductors 20. In some embodiments, the one or more insulated conductors 20 may be equipped with cooling channels (not shown in FIG. 1). In some embodiments, a layer 26 of a semiconductive material (for example, carbon-black filed polymer), a conductive material or a combination thereof may be disposed between each winding 18 and the stator body 28. The layer 26 may be disposed on a surface of the one or more insulated conductors 20. In some embodiments, the layer 26 is disposed on a surface of one or more ceramic insulators of one or more articles 100-1100 (described below). Such layer 26 may aid in suppressing the surface arcing.

It should be understood, however, that assembly of the winding 18 as shown in FIG. 1 may not be done entirely by one entity. For example, a winding may arrive at a customer partially assembled, or the customer may obtain different parts of the winding from different vendors and then assemble the winding themselves.

FIGS. 4-19, 22-25, 27, 28 and 30 show perspective cross-sectional views of one or more articles 100-1100, in various embodiments. It should be noted that the one or more articles 100-1100 discussed herein may be at least a portion of the one or more insulated conductors 20 discussed with reference to FIG. 1. The articles 100-1100 as illustrated in one or more of FIGS. 4-19, 22-25, 27, 28 and 30 may include a single ceramic insulator or multiple ceramic insulators. Some embodiments of the disclosure are directed to methods for forming the one or more articles 100-1100 that may be used in forming the one or more insulated conductors 20 for the winding 18 (FIG. 1). The methods for forming the one or more articles 100-1100 are described with reference to one or more of FIGS. 2-30 in various embodiments. Reference numerals that are common to the articles 100-1100 of FIGS. 2-30, represent similar or identical elements. As will be appreciated by those skilled in the art, various components shown in one or more articles 100-1100 of FIGS. 2-30 can be of any convenient size, shape or size and shape, and the dimensions and shapes given herein are for illustrative purposes only.

Figure 2:
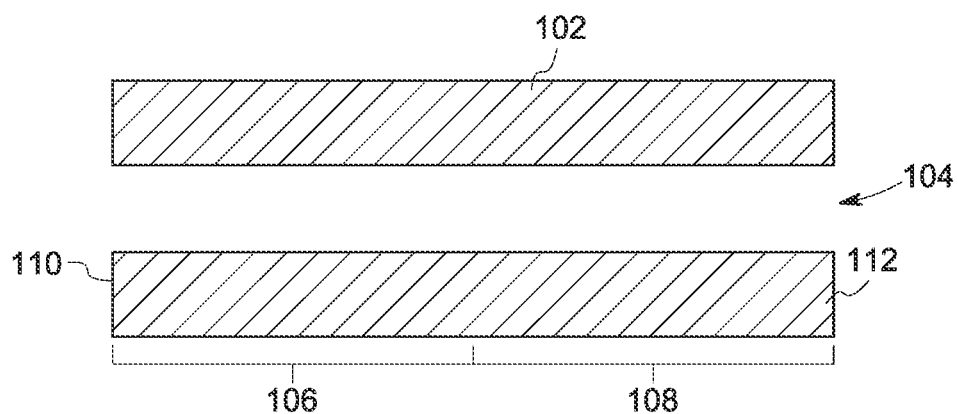
FIG. 2 shows a schematic representation of a step for forming an article in accordance with one embodiment of the present disclosure.
Figure 3:
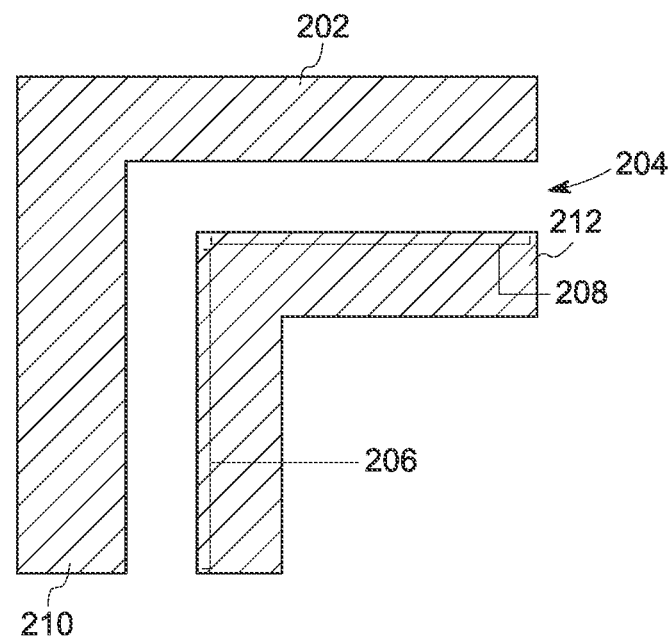
FIG. 3 shows a schematic representation of a step for forming an article in accordance with another embodiment of the present disclosure.
Figure 4:
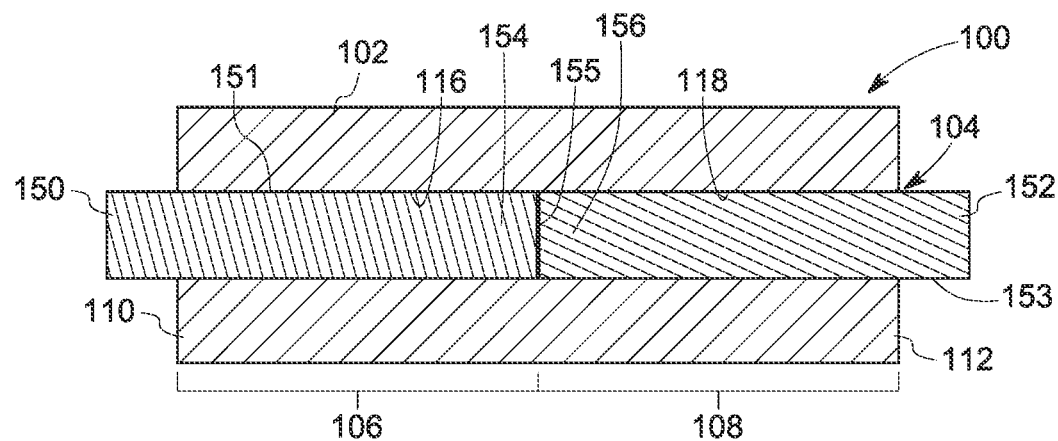
FIG. 4 shows a schematic cross-section view of an article in accordance with one embodiment of the present disclosure.
Figure 5:
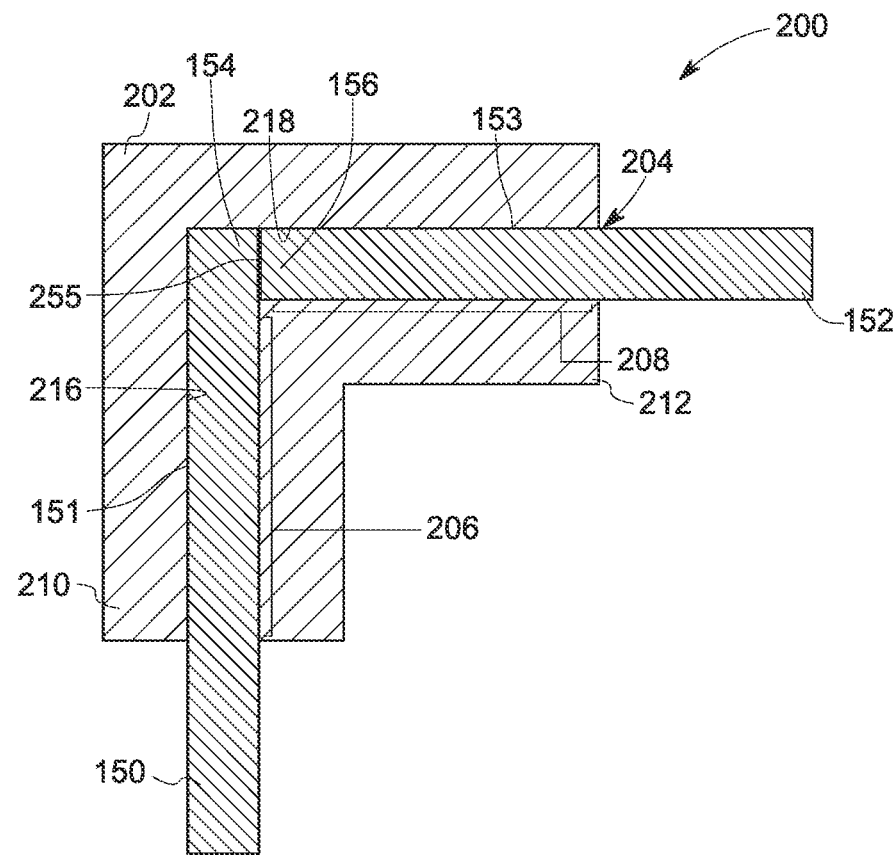
FIG. 5 shows a schematic cross-sectional view of an article in accordance with another embodiment.

FIGS. 4 and 5 show cross-sectional view of articles 100 and 200, in some embodiments. The method for forming the articles 100 and 200 is described with reference to FIGS. 2-5 in some embodiments. Referring to FIGS. 2 and 3, the method includes providing a ceramic insulator (102, 202) having a recess (104, 204). As illustrated, the recess (104, 204) has two regions—a first region (106, 206) and a second region (108, 208) extending continuously from a first end (110, 210) to a second end (112, 212). At least the first end (110, 210) or the second end (112, 212) is open. In embodiments illustrated in FIG. 2, the first region 106 and the second region 108 extend continuously along a length of the ceramic insulator 102. In embodiments as shown in FIG. 3, the first region 206 and the second region 208 extend continuously to two different directions at 90 degrees. However, the two regions—the first region 206 and the second region 208 may extend to two different directions at any angle with a sharp or smooth curve, in some embodiments.

Referring to FIGS. 4 and 5 now, the method includes providing a first conductor 150 and a second conductor 152 within the recess (104, 204). The first conductor 150 and the second conductor 152 may be of any length with respect to the length of the first region (106, 206) and the second region (108, 208) in which they are disposed. The first conductor 150, the second conductor 152 or both may be longer, shorter or equal to the length of their corresponding first region (106, 206) and the second region (108, 208). In some embodiments, the providing the first conductor and the second conductor within the recess includes disposing at least a portion of the first conductor 150 and at least a portion of the second conductor 152 within the recess (104, 204). In some embodiments, an exterior surface 151 of the first conductor 150 and an exterior surface 153 of the second conductor 152 conform respectively to an interior surface (116, 216) of the recess (104, 204) in the first region (106, 206) and an interior surface (118, 218) of the recess (104, 204) in the second region (108, 208).

In some embodiments, the first conductor 150 and the second conductor 152 are preformed. That is, the first conductor 150 and the second conductor 152 may be procured or manufactured by a process as described previously prior to providing them into the recess (104, 204). In these embodiments, the method includes inserting at least a portion of the first conductor 150 into the first region (106, 206) and at least a portion of the second conductor 152 into the second region (108, 208) through at least the first end (110, 210) or the second end (112, 212).

In some embodiments, the providing step includes forming at least the first conductor 150 or the second conductor 152 within the corresponding first region (106, 206), the second region (108, 208) or both regions of the recess (104, 204). The forming of the at least first conductor 150 or the second conductor 152 may be performed by electroplating, 3D printing, electroless plating, or pouring molten metal into the corresponding first region (106, 206), the second region (108, 208) or both. The exterior surface 151 of the first conductor 150, the exterior surface 153 of the second conductor 152 or both conform to their corresponding interior surface (116, 216) of the first region (106, 206) and the interior surface (118, 218) of the second region (108, 208). In some embodiments, the configuration having at least the first conductor 150 or the second conductor 152 disposed within the corresponding first region (106, 206) and the second region (108, 208) of the recess (104, 204) may be formed by 3D printing.

After providing the first conductor 150 and the second conductor 152 in their respective first region (106, 206) and the second region (108, 208) within the recess (104, 204), the method includes joining the first conductor 150 and the second conductor 152. In some embodiments, the method includes joining an end portion 154 of the first conductor 150 to an end portion 156 of the second conductor 152 to form a conductor joint (155, 255). After joining the first conductor 150 and the second conductor 152, the article (100, 200) as shown in one or more of FIGS. 4 and 5 is formed. The article (100, 200) includes the ceramic insulator (102, 202) having the recess (104, 204). The first conductor 150 is disposed within the recess (104, 204) in the first region (106, 206) and the second conductor 152 is disposed within the recess (104, 204) in the second region (108, 208). The first conductor 150 and the second conductor 152 are joined at the conductor joint (155, 255) within the recess (104, 204).

Figure 6:
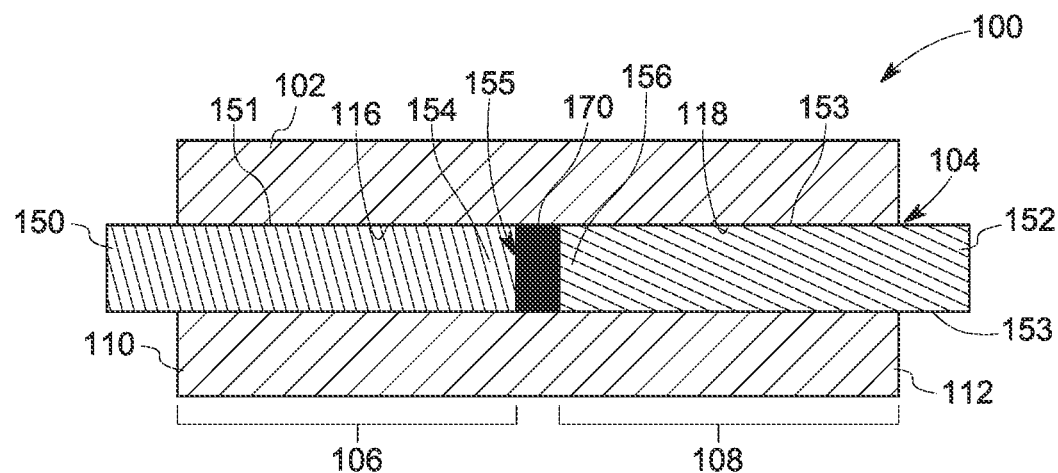
FIG. 6 shows a schematic representation of a step for forming an article in accordance with one embodiment of the present disclosure.
Figure 7:
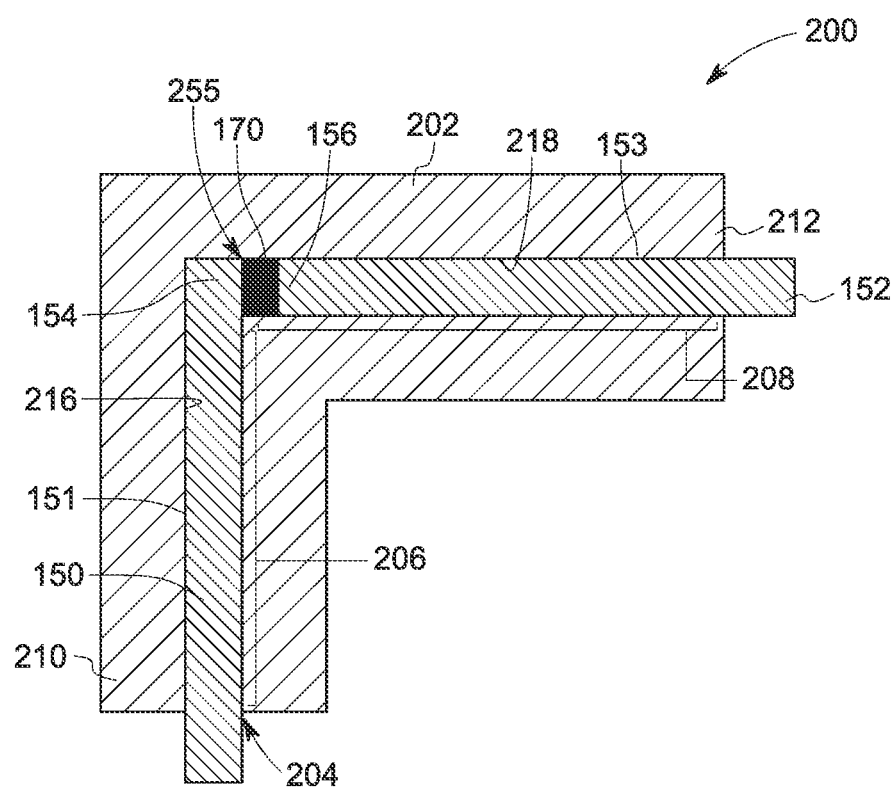
FIG. 7 shows a schematic representation of a step for forming an article in accordance with one embodiment of the present disclosure.
Figure 8:
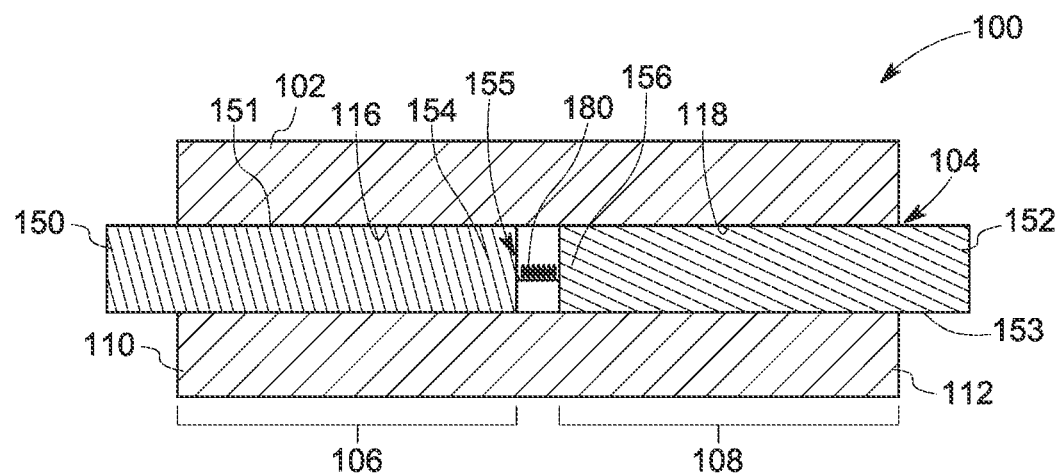
FIG. 8 shows a schematic representation of a step for forming an article in accordance with one embodiment of the present disclosure.
Figure 9:
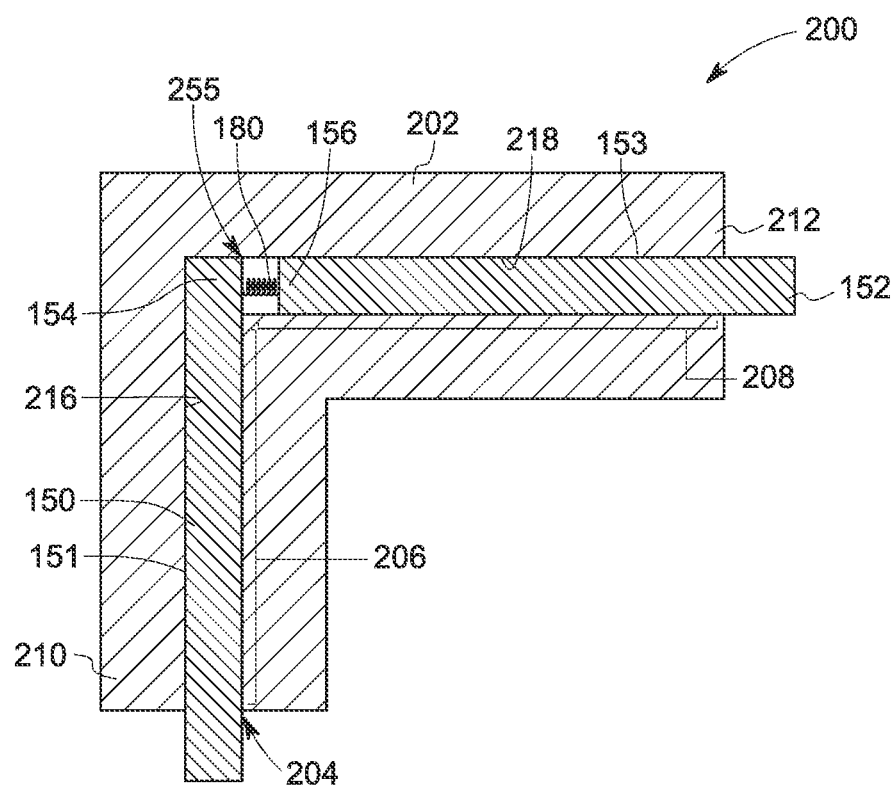
FIG. 9 shows a schematic cross-sectional view of an article, in accordance with one embodiment.

The joining of the first conductor 150 and the second conductor 152 may be performed with or without a joining media, for example a bonding material or a conductor, by several ways. In some embodiments, the method includes providing a first joining media between the portions of the first conductor 150 and the second conductor 152 to be joined. In some embodiments, as shown in FIGS. 6 and 7, the method includes providing a first bonding material 170 between the end portion 154 of the first conductor 150 and the end portion 156 of the second conductor 152 to subsequently form the conductor joint (155, 255). In some embodiments, the first bonding material 170 may be provided at the end portion 154 of the first conductor 150, the end portion 156 of the second conductor 152 or both end portions 154 and 156 to be joined. The first bonding material 170 may include soldering material, a brazing material or a combination thereof. Suitable examples include, but are not limited to, Sn/Pb alloy, Sn/Ag/Cu alloy and Ag/Cu/In/Sn alloy. In some embodiments, the first conductor 150 and the second conductor 152 may be joined using a third conductor 180 between the end portions 154 and 156 (to be joined) of the first conductor 150 and the second conductor 152. In these instances, the method includes providing the third conductor 180, for example a spring conductor between the end portions 154 and 156 (to be joined) as shown in FIGS. 8 and 9 to form the conductor joint (155, 255) (FIGS. 4 and 5). Other examples of the third conductor may include a hollow metal coupler, a soft metal pad or a rod.

Figure 10:
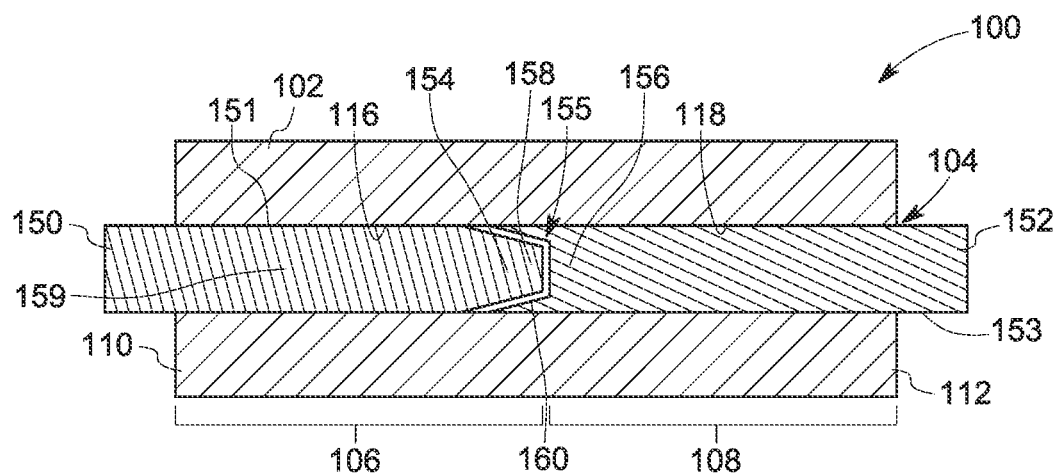
FIG. 10 shows a schematic representation of a step for forming an article in accordance with one embodiment of the present disclosure.
Figure 11:
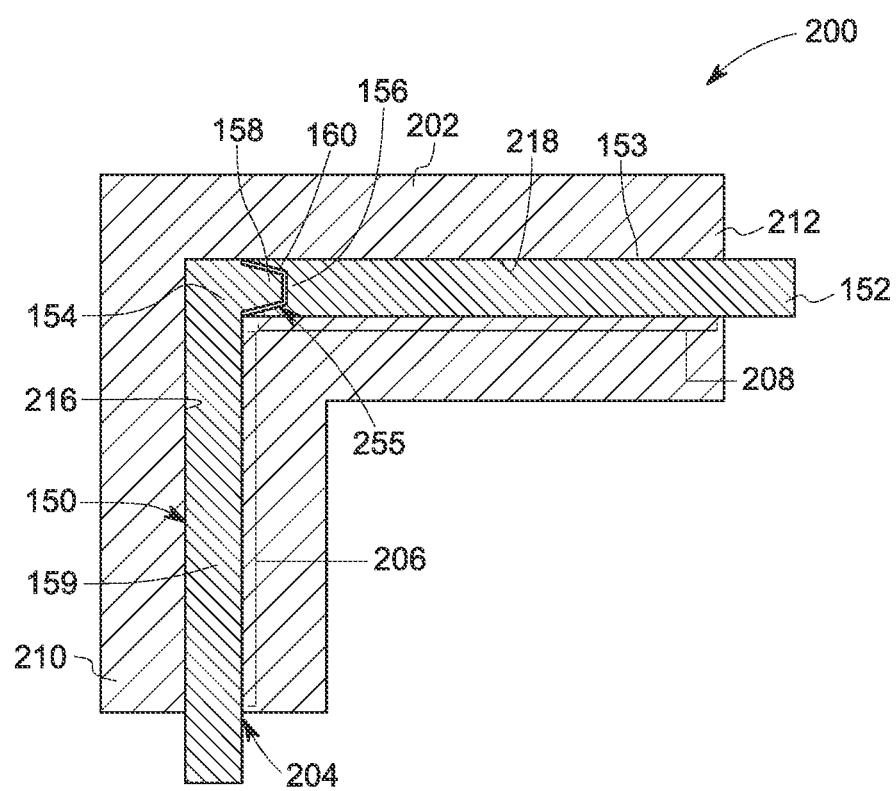
FIG. 11 shows a schematic representation of a step for forming an article in accordance with one embodiment of the present disclosure.

In some embodiments, as illustrated in FIGS. 10 and 11, the end portion 154 of the first conductor 150 has a narrow portion 158 having a width less than a width of the middle portion 159 of the first conductor 150. In these instances, the end portion 156 of the second conductor 152 has a hollow region 160. The shape and size of the hollow region 160 is such as the narrow portion 158 of the first conductor 150 fits (conforms) in the hollow region 160 of the second conductor 152 on joining the first conductor 150 and the second conductor 152 to form the conductor joint (155, 255) (FIGS. 4 and 5). The joining of the narrow portion 158 and the hollow region 160 can be performed with or without the first joining media as discussed herein.

In some embodiments, at least one of the first conductor 150 and the second conductor 152 may have a varying cross-sectional area along the length of respective first conductor 150 and second conductor 152. In some embodiments, the cross sections of the first conductor 150 and the second conductor 152 should match with the cross-sections of the corresponding regions i.e., the first region (106, 206) and the second region (108, 208) of the recess (104, 204) in which these are disposed.

Figure 12:
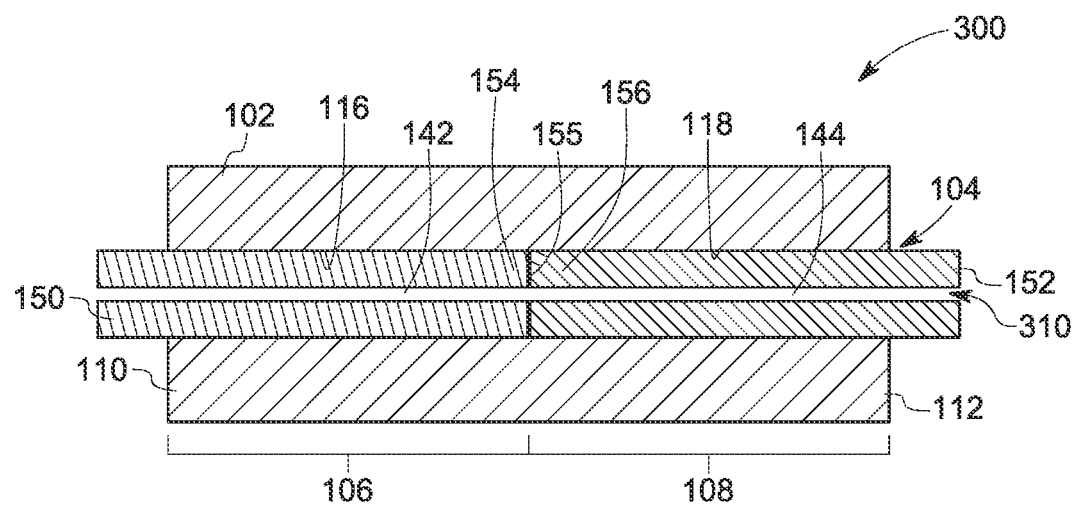
FIG. 12 shows a schematic cross-sectional view of an article in accordance with one embodiment of the present disclosure.
Figure 13:
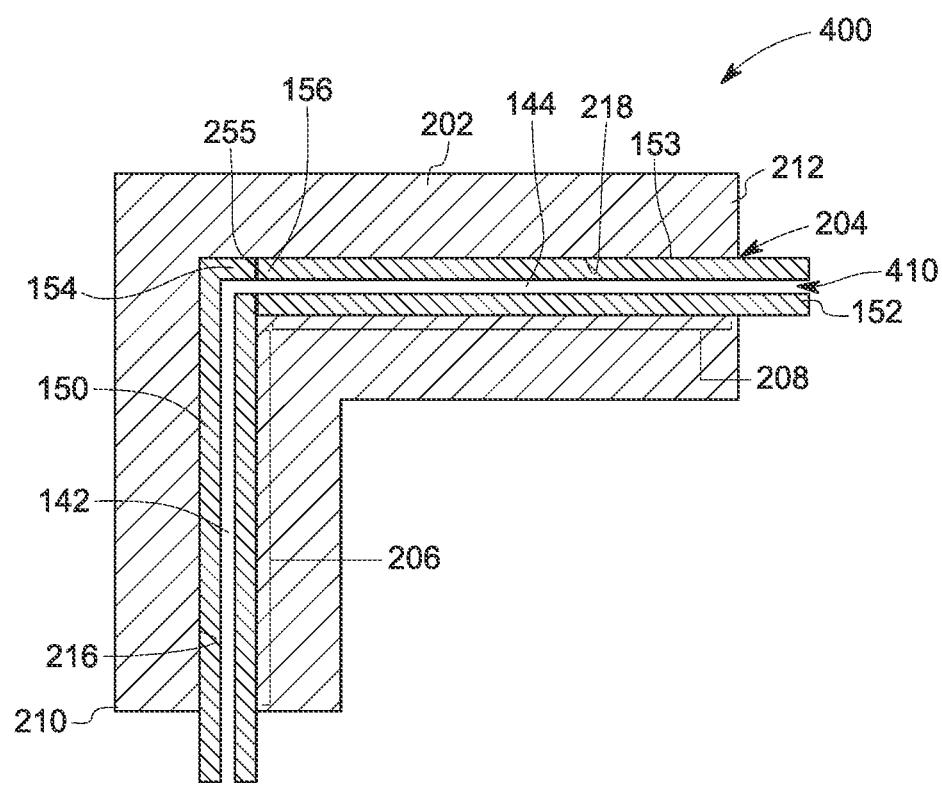
FIG. 13 shows a schematic cross-sectional view of an article in accordance with one embodiment of the present disclosure.

FIGS. 12 and 13 respectively illustrate some embodiments 300 and 400 of articles 100 and 200 of FIGS. 4 and 5, where the first conductor 150 and the second conductor 152 define a cooling channel 310 as shown in FIG. 12 and a cooling channel 410 as shown in FIG. 13. As illustrated, the first conductor 150 and the second conductor 152 have hollow portions 142 and 144 which define the cooling channel (310, 410). After disposing the first conductor 150 and the second conductor 152, the method includes joining the end portion 154 of the first conductor 150 and the end portion 156 of the second conductor 152 to form the conductor joint (155, 255). The joining process may be performed using one or more ways as discussed with respect to FIGS. 6-11, in some embodiments.

Figure 14:
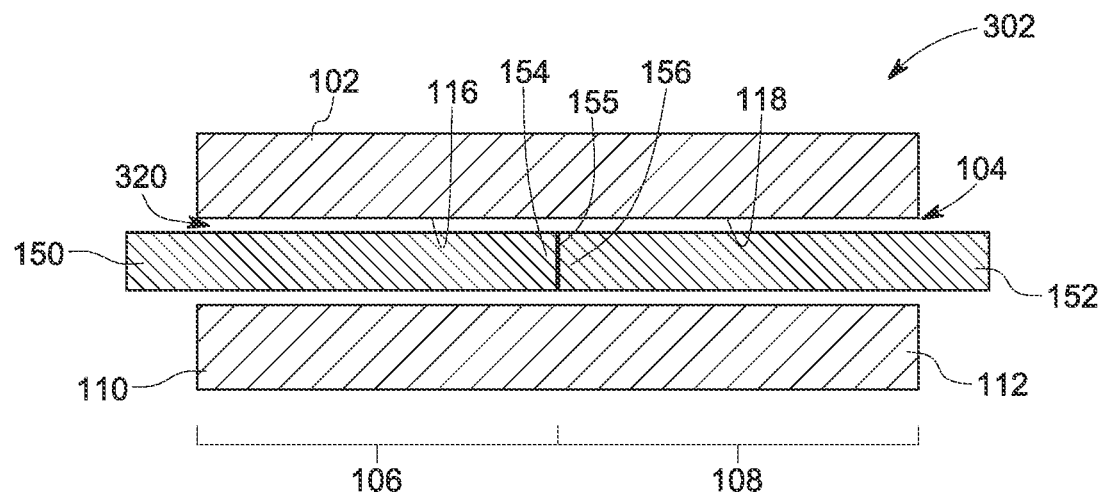
FIG. 14 shows a schematic cross-sectional view of an article in accordance with one embodiment of the present disclosure.
Figure 15:
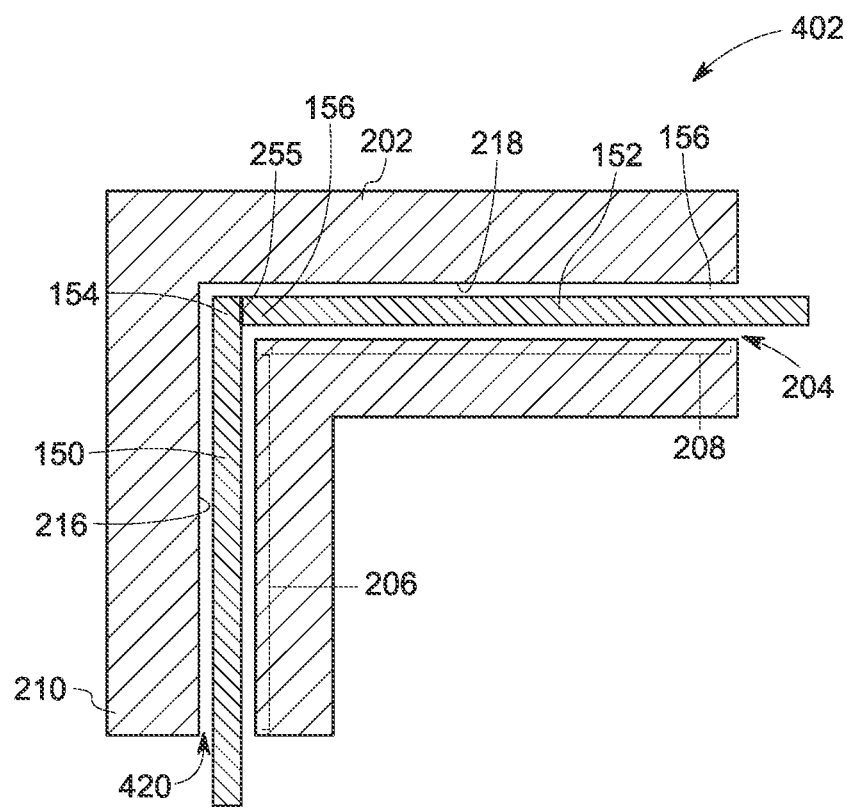
FIG. 15 shows a schematic cross-sectional view of an article in accordance with one embodiment of the present disclosure.

In some other embodiments, the above configuration may be reversed. For example, FIGS. 14 and 15 show embodiments 302 and 402 of the articles 100 and 200 in which the first conductor 150 and the second conductor 152 are disposed in a cooling channel (320, 420). In FIGS. 14 and 15, the first conductor 150 and the second conductor 152 have their cross sectional areas less than their corresponding cross-section areas of the first region (106, 206) and the second region (108, 208). Therefore, the cooling channel (320, 420) is defined in the recess (104, 204) between the first conductor 150 and the interior surface (116, 216) of the ceramic insulator (102, 202) in the first region (106, 206) and between the second conductor 152 and the interior surface (118, 218) of the ceramic insulator (102, 202) in the second region (108, 208). After disposing the first conductor 150 and the second conductor 152, the method includes joining the end portion 154 of the first conductor 150 and the end portion 156 of the second conductor 152 to form the conductor joint (155, 255). The joining process may be performed using one or more ways as discussed with respect to FIGS. 6-11, in some embodiments.

In some embodiments, an article includes one or more ceramic insulators having a plurality of recesses. The one or more ceramic insulators include a first portion including a first set of recesses of the plurality of recesses and a second portion includes a second set of recesses of the plurality of recesses. At least a portion of a first conductor and at least a portion of a first cooling channel are overlappingly disposed in a recess of the first set of recesses. At least a portion of a second conductor and at least a portion of a second cooling channel are disposed in at least one recess of the second set of recesses wherein the at least a portion of the second cooling channel offsets from the at least a portion of the second conductor.

Figure 16:
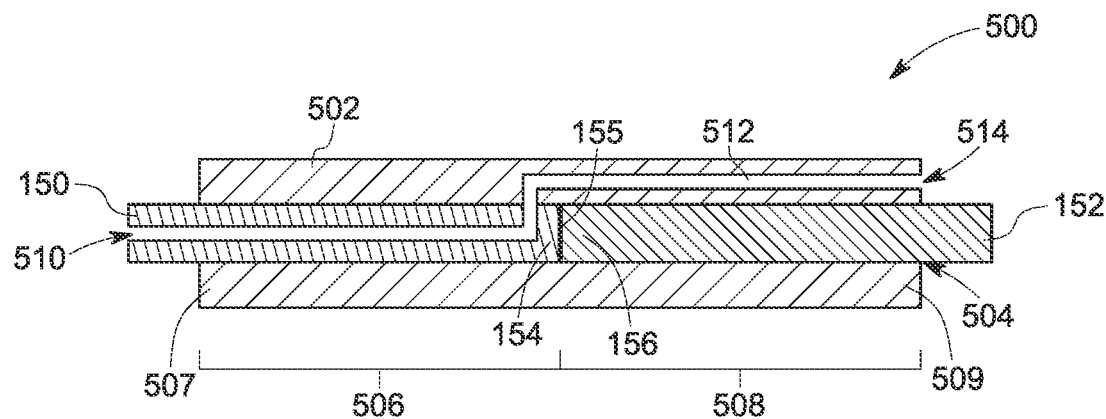
FIG. 16 shows a schematic cross-sectional view of an article in accordance with one embodiment of the present disclosure.
Figure 17:
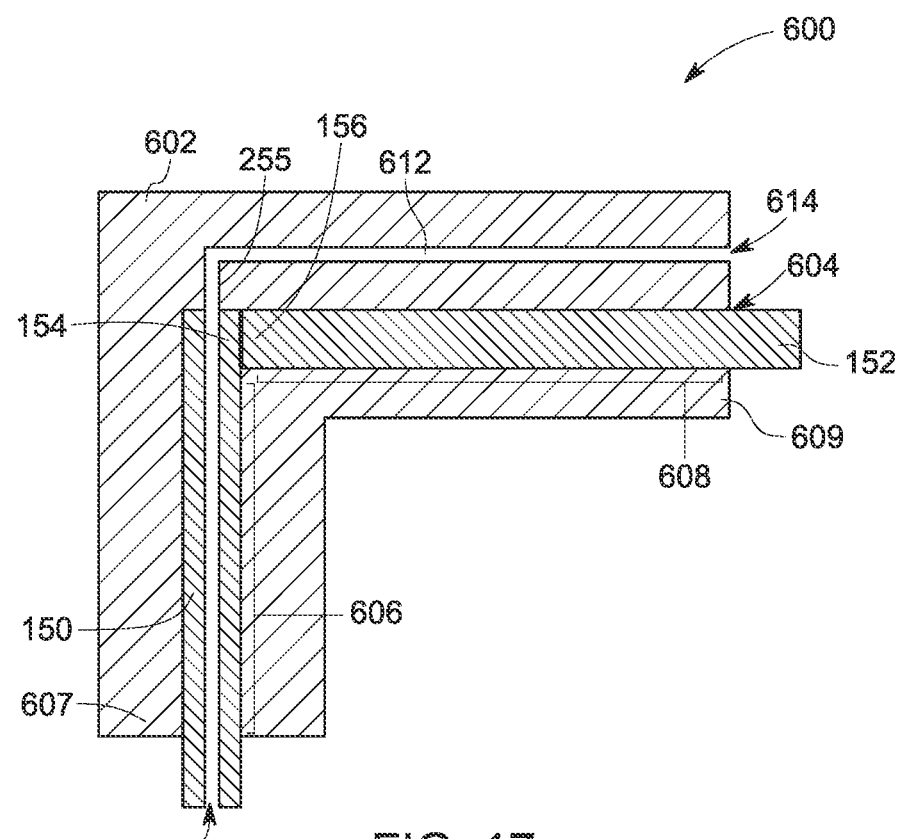
FIG. 17 shows a schematic cross-sectional view of an article in accordance with one embodiment of the present disclosure.

FIGS. 16 and 17 illustrate, in some embodiments, articles 500 and 600. The articles 500 and 600 include a ceramic insulator (502, 602) having a first region (506, 606) and a second region (508, 608). The ceramic insulators 502, 602 are similar to the ceramic insulator 102, 202 respectively as shown in one or more FIGS. 2-5 except that each ceramic insulator 502 and 602 includes two recesses. The first region (506, 606) and the second region (508, 608) define a first recess (504, 604) in the ceramic insulator (502, 602) continuously from an end (507, 607) to another end (509, 609). The second region (508, 608) further has a second recess (514, 614) extending parallelly to a portion of the first recess (504, 604) in the second region (508, 608). In some other embodiments, the second recess (514, 614) may extend to any other desired direction. At least a portion of the first conductor 150 is disposed within the first recess (504, 604) in the first region (506, 606) and at least a portion of the second conductor 152 is disposed within the first recess (504, 604) in the second region (508, 608). In the illustrated embodiments, the first conductor 150 defines a first cooling channel (510, 610) along a length of the first conductor 150 (similar to as shown in FIGS. 12 and 13). That is, the at least a portion of the first conductor 150 and at least a portion of the first cooling channel (510, 610) are overlappingly disposed within the first recess (504, 604) in the first region (506, 606). In the second region (508, 608), a second cooling channel (512, 612) is defined in the second recess (514, 614). As illustrated, the second cooling channel (512, 612) offsets the second conductor 552 disposed in the second region (508, 608) of the first recess (504, 604). The second conductor 152 does not define a cooling channel, in these embodiments. Furthermore, the first cooling channel (510, 610) and the second cooling channel (512, 612) are in fluid communication.

Figure 18:
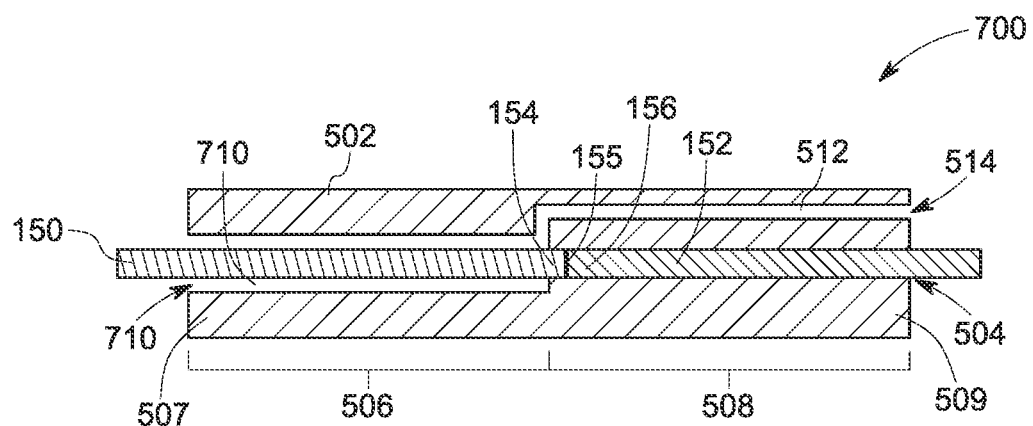
FIG. 18 shows a schematic cross-sectional view of an article in accordance with one embodiment of the present disclosure.
Figure 19:
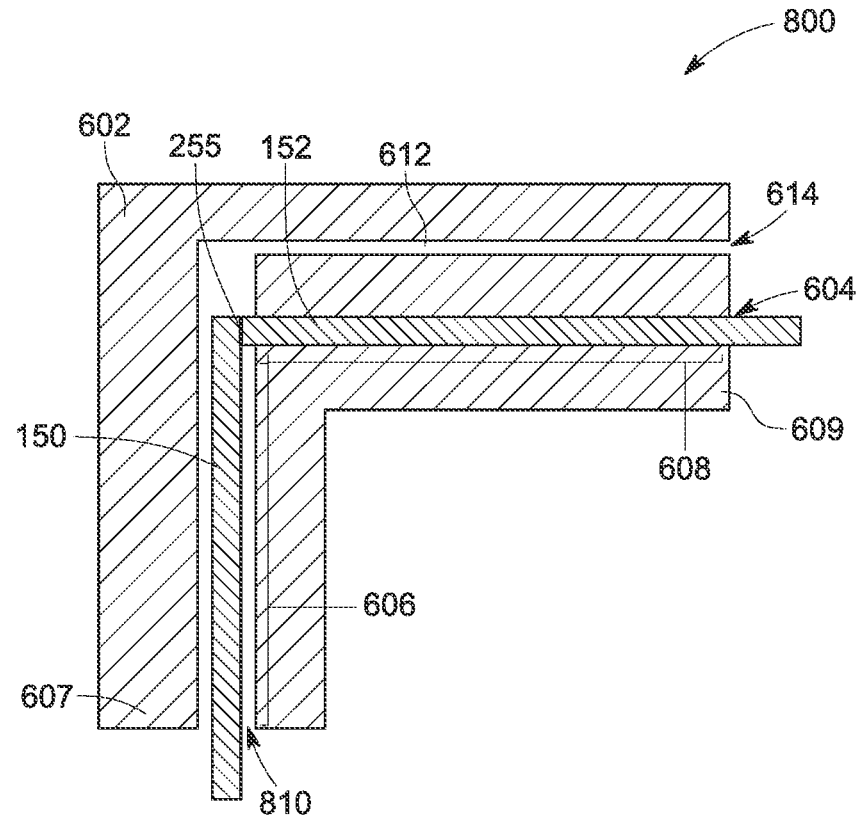
FIG. 19 shows a schematic cross-sectional view of an article in accordance with one embodiment of the present disclosure.

In some embodiments, the configuration may be reversed with respect to the position of the of the conductors and cooling channels as illustrated in FIGS. 18 and 19. FIGS. 18 and 19 illustrate some embodiments 700 and 800 of the articles 500 and 600 of FIGS. 16 and 17, in which the first conductor 150 and the second conductor 152 are disposed in a first cooling channel (710, 810). In these embodiments, the cross sectional area of the first conductor 150 is less than the cross-section area of the first recess (504, 604) in the first region (506, 606). Therefore, the first conductor 150 defines the first cooling channel (710, 810) along the length of the first conductor 150, for example around the first conductor 150. That is, the first conductor 150 and the first cooling channel (710, 810) are overlappingly disposed within the first recess (504, 604) in the first region (506, 606). In the second region (508, 608), a second cooling channel (512, 612) is defined in the second recess (514, 614). As illustrated, the second cooling channel (512, 612) offsets the second conductor 152 disposed in the second region (508, 608) of the first recess (504, 604). The second conductor 152 does not define a cooling channel, in these embodiments. Furthermore, the first cooling channel (710, 810) and the second cooling channel (512, 612) are in fluid communication.

After disposing the first conductor 150 and the second conductor 152 in the first recess (504, 604) as shown in one or more of FIGS. 16-19, the end portion 154 of the first conductor 150 and the end portion 156 of the second conductor 152 are joined to form the conductor joint (155, 255). The joining process may be performed using one or more ways as discussed with respect to FIGS. 6-11, in some embodiments.

Figure 20:
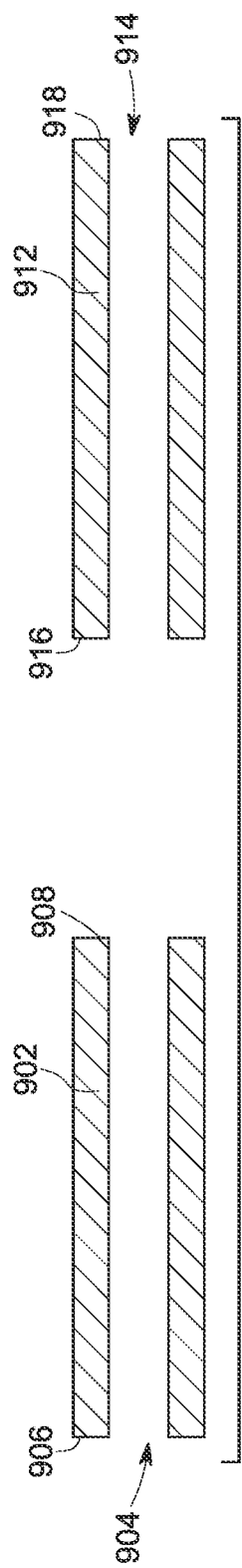
FIG. 20 shows a schematic representation of a step for forming an article in accordance with one embodiment of the present disclosure.
Figure 21:
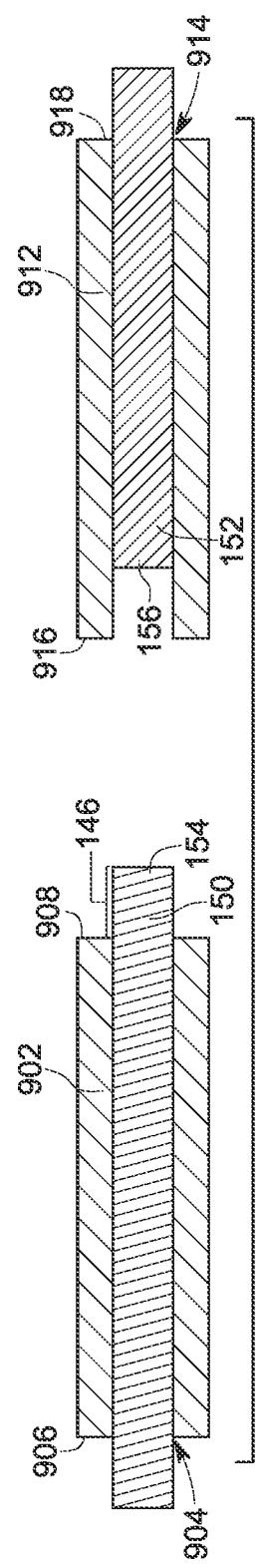
FIG. 21 shows a schematic representation of a step for forming an article in accordance with one embodiment of the present disclosure.
Figure 22:
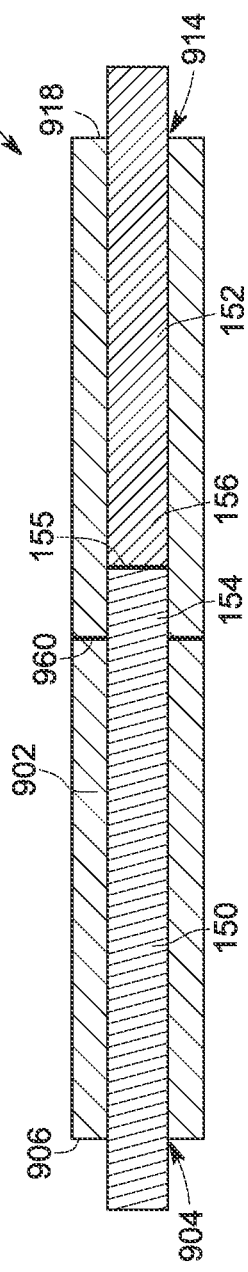
FIG. 22 shows a schematic cross-sectional view of an article in accordance with one embodiment of the present disclosure.

In some embodiments, FIG. 22 shows a prospective view of an article 900 that include a first ceramic insulator 902 and a second ceramic insulator 912. The method for forming the article 900 is described with reference to FIGS. 20-22. The method includes providing the first ceramic insulator 902 having a first recess 904 extending along a length of the first ceramic insulator 902 from one end 906 to another end 908 and the second ceramic insulator 912 having a second recess 914 extending along a length of the second ceramic insulator 912 from one end 916 to another end 918 as shown in FIG. 20. At least one end of each of the first recess 904 and the second recess 914 is open. The method includes providing at least a portion of a first conductor 150 within the first recess 904 and providing at least a portion of a second conductor 152 within the second recess 914 as shown in FIG. 21. In some embodiments, the first conductor 150, the second conductor 152, or both may be manufactured prior to disposing them respectively in the first recess 904, the second recess 914 or both, or manufactured respectively within the first recess 904, the second recess 914 or both, as discussed previously with respect to some embodiments. In some embodiments, the method may include inserting at least a portion of the first conductor 150 into the first recess 904 of the first ceramic insulator 902 and at least a portion the second conductor 152 into the second recess 914 of the second ceramic insulator 912. In some embodiments, the first conductor 150, the second conductor 152 or both may be disposed within the respective recesses 904 and 914 by electroplating or 3D printing. The material and manufacturing details of the ceramic insulators and conductors are provided previously.

Referring to FIG. 22, after disposing the first conductor 150 and the second conductor 152, the method includes joining the end portion 154 of the first conductor 150 and the end portion 156 of the second conductor 152. On joining, the first conductor 150 and the second conductor 152 forms a conductor joint 155. The joining of the first conductor 150 and the second conductor 152 may be performed using one or more ways as discussed with respect to FIGS. 6-11, in some embodiments. Furthermore, in some embodiments, the method further includes joining the first ceramic insulator 902 and the second ceramic insulator 912 prior to, simultaneously or after joining the first conductor 150 and the second conductor 152. In some embodiments, the method includes joining the end 908 of the first ceramic insulator 902 to the end 916 of the second ceramic insulator 912. On joining the first ceramic insulator 902 and the second ceramic insulator 912, a ceramic joint 960 is formed.

Figure 23:
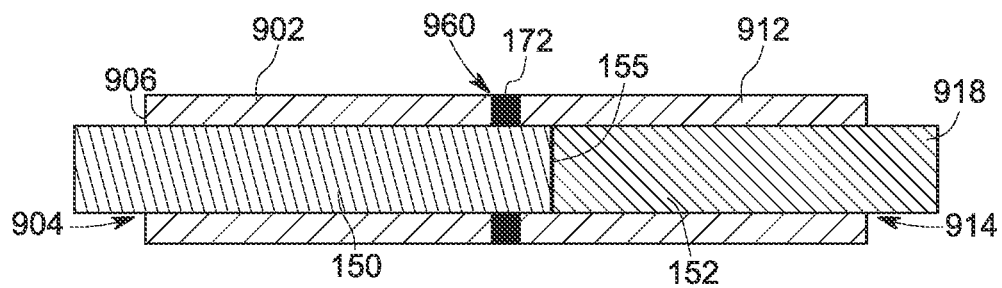
FIG. 23 shows a schematic representation of a step for forming an article in accordance with one embodiment of the present disclosure.
Figure 24:
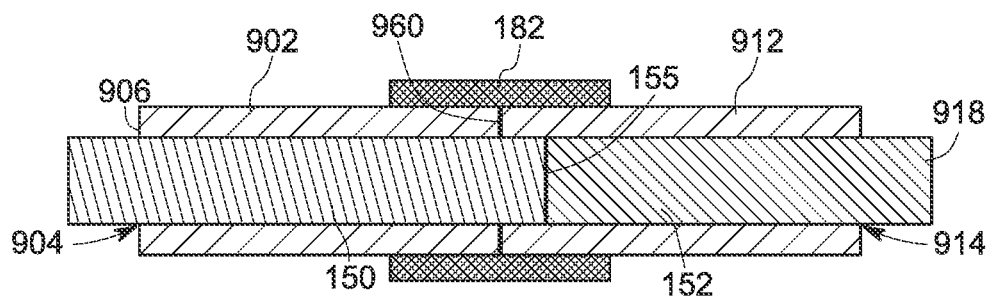
FIG. 24 shows a schematic representation of a step for forming an article in accordance with one embodiment of the present disclosure.
Figure 25:
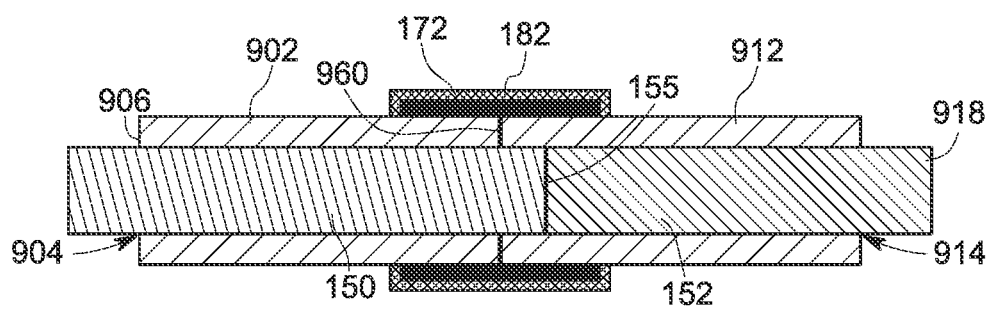
FIG. 25 shows a schematic representation of a step for forming an article in accordance with one embodiment of the present disclosure.

Various joining techniques may be used for joining the first ceramic insulator 902 and the second ceramic insulator 912, for example mechanical attachment, bonding through a bonding material or mechanical couplers, using heating/melting and the like. In some embodiments, the method includes providing a second joining media between the first ceramic insulator 902 and the second ceramic insulator 912. For example, as shown in FIG. 23, the method includes providing a second bonding material 172 between the first ceramic insulator 902 and the second ceramic insulator 912 to form the ceramic joint 960. In some embodiments, the method includes providing a ceramic insulator sleeve 182 for joining the first ceramic insulator 902 and the second ceramic insulator 912 as shown in FIG. 24. In some embodiments, the second bonding material 172 may further be provided between the ceramic insulator sleeve 182 and the first and second ceramic insulator 902, 912 as shown in FIG. 25. Suitable examples for the second bonding material 172 for joining the first and second ceramic insulators 902, 912 include but not limited to, commercially available ceramic cements and high temperature ceramic adhesives. Moreover, the joining of the first ceramic insulator 902 and the second ceramic insulator 912 may be performed at a temperature in a range from about 200 degrees Celsius to about 800 degrees Celsius. In some embodiments, the temperature is between about 300 degrees Celsius and about 500 degrees Celsius. The joining temperature is such that to minimize degradation due to the difference of the coefficient(s) of thermal expansion (CTE) of the first and second ceramic insulators 902 and 912 and the CTE of the first and second conductors 150 and 152. The term "about," as used herein, is meant to encompass variations of 20%, 10%, 5%, 1%, 0.5%, or even 0.1% of the specified value.

The first conductor 150 and the second conductor 152 may have lengths equal to or different from the respective recesses 904 and 914 in which they are disposed. As illustrated in FIG. 21, a portion 146 at the end portion 154 of the first conductor 150 is extending beyond the end 908 of the first ceramic insulator 902 and the end portion 156 of the second conductor 152 is depressed inside the second recess 914 of the second ceramic insulator 912 (i.e., the end 916 of the second ceramic insulator 912 is extending beyond the end portion 156 of the second conductor 152). In these embodiments as shown in FIGS. 21 and 22, the end portion 154 of the first conductor 150 and the end portion 156 of the second conductor 152 are fully covered by the first ceramic insulator 902 and the second ceramic insulator 912 after joining the first conductor 150 to the second conductor 152 and the first ceramic insulator 902 to the second ceramic insulator 912.

In some embodiments, the article 900 as shown in FIG. 22, may include one or more cooling channels. The one or more cooling channels may be defined by at least one of the first ceramic insulator 902, the second ceramic insulator 912, the first conductor 150, or the second conductor 152 as discussed with respect to one or more FIGS. 12-19 in some embodiments.

The ceramic insulators as shown in embodiments described herein have recesses extending along one or two directions. Such ceramic insulators are shown for illustration purposes, however the ceramic insulators may have recesses defined in multiple directions and of any shape. Further, the ceramic insulators may have any suitable dimensions as required for desirable configuration. Moreover, an article may include any number of ceramic insulators and any number of conductors in any combination, for example including any combination of the articles 100-900 (as shown in one or more FIGS. 4, 5, 12-19, 22) as per manufacturing suitability and requirement. For example, FIGS. 27, 29 and 30 respectively show articles 1000, 1001 and 1100 including more than two ceramic insulators and two or more conductors.

Figure 26:
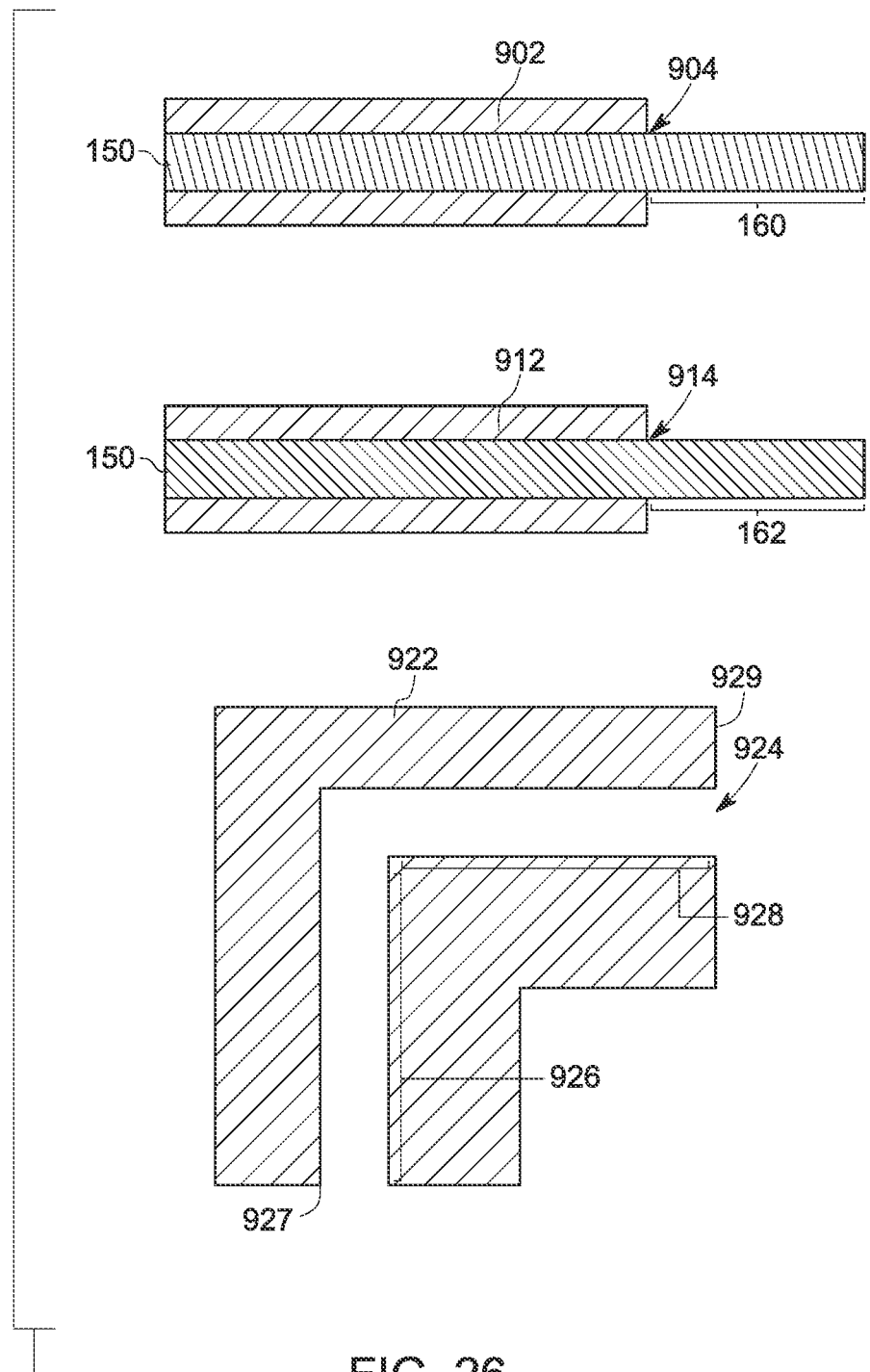
FIG. 26 shows a schematic representation of a step for forming an article in accordance with one embodiment of the present disclosure.
Figure 27:
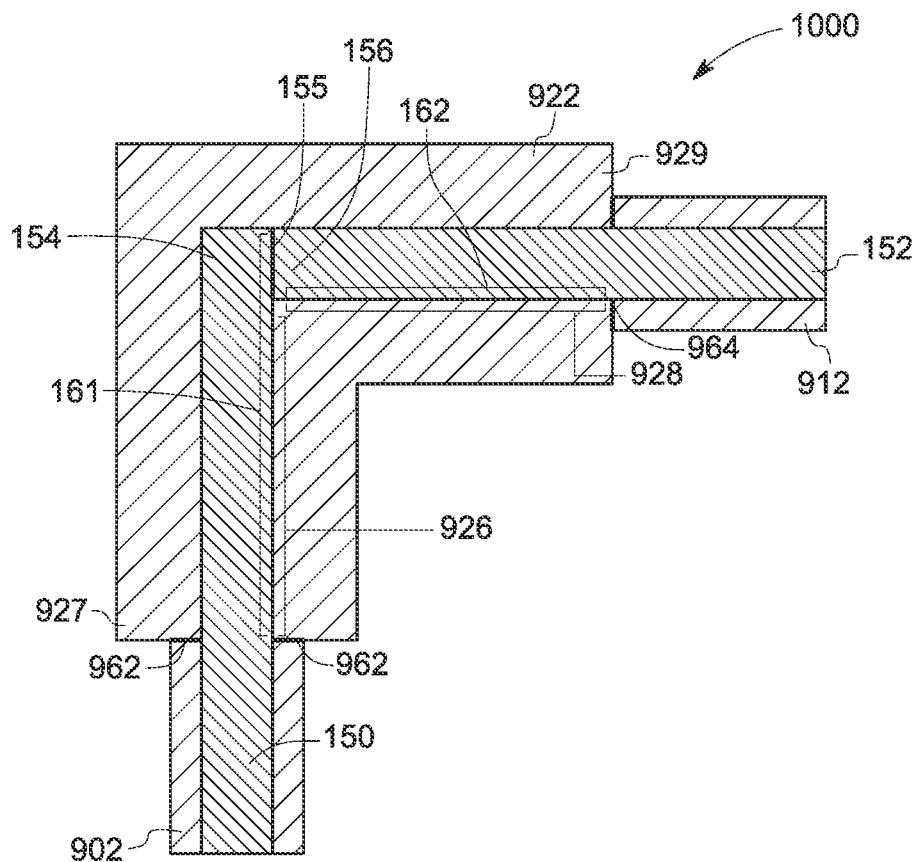
FIG. 27 shows a schematic cross-sectional view of an article in accordance with one embodiment of the present disclosure.

FIG. 27 illustrates embodiments where the article 1000 includes three ceramic insulators. Referring to FIG. 26, the method includes providing a first ceramic insulator 902, a second ceramic insulator 912 as shown in FIG. 20 and a third ceramic insulator 922 similar to the ceramic insulator 200 as shown in FIG. 3. The third ceramic insulator 922 has a recess 924 having a first region 926 and a second region 928 extending from one end 927 to another end 929 of the third ceramic insulator 922. The recess 924 is open at both the ends 927 and 929. A first conductor 150 and a second conductor 152 are respectively disposed in the first recess 904 of the first ceramic insulator 902 and the second recess 914 of the second ceramic insulator 912 as shown in FIG. 26. In these embodiments, the length of each, the first conductor 150 and the second conductor 152 is more than the length of their respective recesses 904 and 914, and the portion 161 of the first conductor 150 and the portion 162 of the second conductor 152 are respectively extending out of the first recess 904 and the second recess 914. As illustrated in FIG. 27, the method includes disposing the portion 161 of the first conductor 150 within the recess 924 in the first region 926 of the third ceramic insulator 922 and the portion 162 of the second conductor 152 in the second region 928 of the recess 924. These portions 161 and 162 are disposed respectively in the first region 926 and the second region 928 of the third ceramic insulator 922 through the ends 927 and 929. After disposing the portions 161 and 162 of the first conductor 150 and the second conductor 152, the method includes joining the first conductor 150 and the second conductor 152 within the recess 924. The end portion 154 of the first conductor 150 and the end portion 156 of the second conductor 152 are joined. The first conductor 150 and the second conductor 152 are joined to form the conductor joint 155. The joining may be performed using one or more ways as discussed with respect to FIGS. 6-11. Further, the method includes joining the first ceramic insulator 902 and the second ceramic insulator 912 to the third ceramic insulator 922 to form a first ceramic joint 962 and a second ceramic joint 964. These joining may be performed using one or more ways as discussed with respect to FIGS. 23-25. After performing the joining of the first conductor 150 and the second conductor 152 and the joining of the first ceramic insulator 902 and the second ceramic insulator 912 to the third ceramic insulator 922, the first conductor 150 and the second conductor 152 are fully covered by the first, second and third ceramic insulators 902, 912, and 922.

Figure 28:
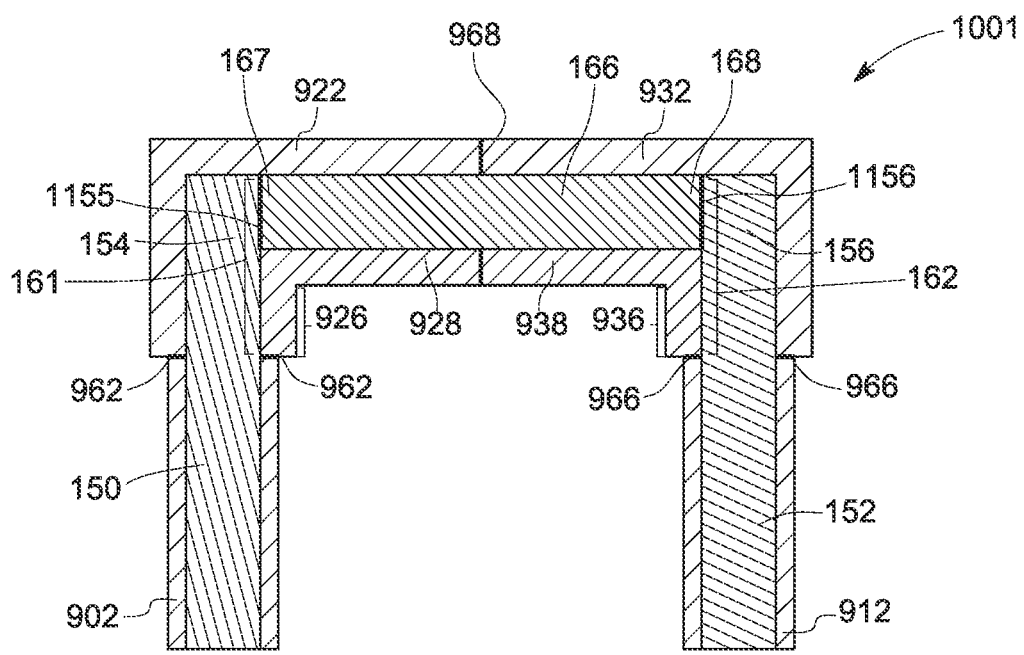
FIG. 28 shows a schematic cross-sectional view of an article in accordance with one embodiment of the present disclosure.

Some embodiments provide an article 1001 as shown in FIG. 28. The article 1001 includes the first ceramic insulator 902, the second ceramic insulator 912, a third ceramic insulator 922 as shown in FIG. 26 and a fourth ceramic insulator 932 mirror image of the third ceramic insulator 922. The fourth ceramic insulator 932 has a recess 934 having a first region 936 and a second region 938. Referring to FIG. 26, the first conductor 150 is disposed in the first recess 904 of the first ceramic insulator and the second conductor is disposed in the second recess 914 of the second ceramic insulator 912 as described above. As shown in FIG. 28, the portion 161 of the first conductor 150 is disposed in the first region 926 of the third ceramic insulator 922, the portion 162 of the second conductor 152 is disposed in the first region 936 of the fourth ceramic insulator 932 and a third conductor 166 is disposed in the second region 928 of the third ceramic insulator 922 and the second region 938 of the fourth ceramic insulators 922 and 932. In some embodiments, two or more conductors may be disposed in these regions and joined together. After disposing the portion 161 of the first conductor 150 and the portion 162 of the second conductor 152, the method includes joining the end portion 154 of the first conductor 150 with an end portion 167 of the third conductor 166 and the end portion 156 of the second conductor 152 with another end portion 168 of the third conductor 166. The end portion 154 of the first conductor 150 is joined with the end portion 167 of the third conductor 166 to form a first conductor joint 1155 and the end portion 156 of the second conductor 152 is joined with the end portion 168 of the third conductor 166 at a second conductor joint 1156. The joining may be performed using one or more ways as discussed with respect to FIGS. 6-11 in above embodiments. Further, the method includes joining the first ceramic insulator 902 to the third ceramic insulator 922 and the second ceramic insulators 912 to the fourth ceramic insulator 932 to form a first ceramic joint 962 and a second ceramic joint 966. Further, the method includes joining the third ceramic insulator 922 and the fourth ceramic insulator 932 to form the third ceramic joint 968. These joining may be performed using one or more ways as discussed with respect to FIGS. 23-25. After performing the joining of the first conductor 150 and the second conductor 152 to the third conductor 166 and the joining of the first ceramic insulator 902 to the third ceramic insulator 922, the second ceramic insulator 912 to the fourth ceramic insulator 932, and the third ceramic insulator 922 to the third ceramic insulator 932, the first conductor 150, the second conductor 152 and the third conductor 166 are fully covered by the first, second, third and fourth ceramic insulators 902, 912, 922 and 932.

Figure 29:
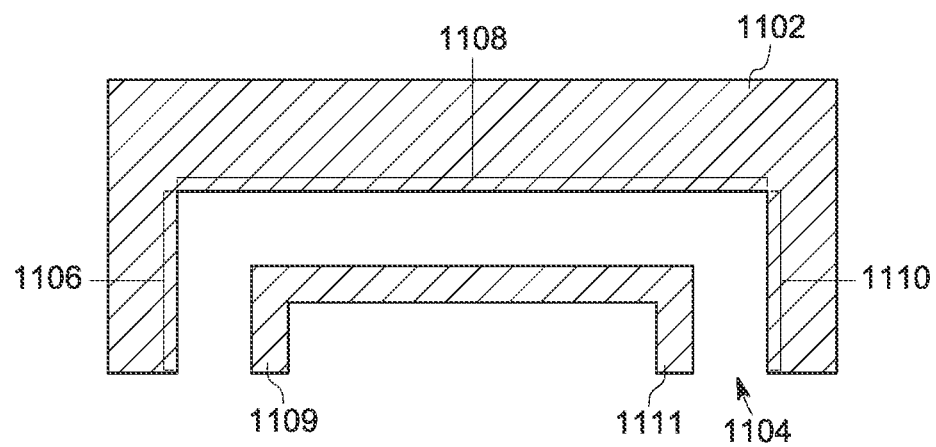
FIG. 29 shows a schematic representation of a step for forming an article in accordance with one embodiment of the present disclosure.
Figure 30:
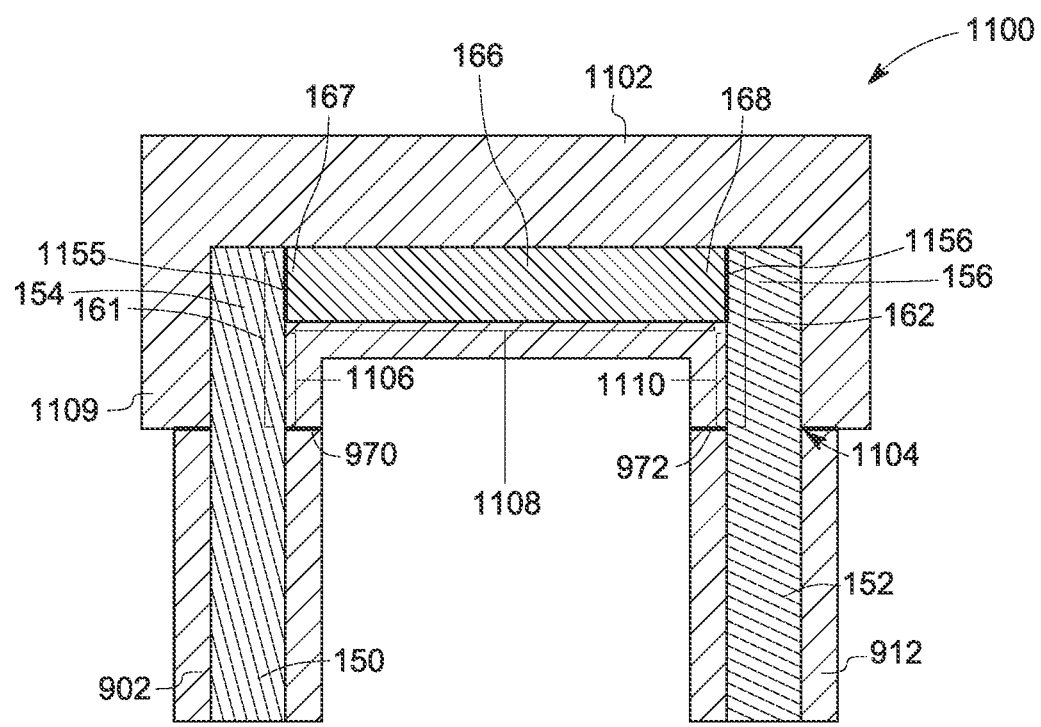
FIG. 30 shows a schematic cross-sectional view of an article, in accordance with one embodiment of the present disclosure.

FIG. 30 illustrates an article 1100 that includes three ceramic insulators and three conductors. The method includes providing a first ceramic insulator 902 having a first conductor 150 disposed in the first recess 904 and a second ceramic insulator 912 having a second conductor 152 disposed in the second recess 914 as shown in FIG. 26. The method also provides a fifth ceramic insulator 1102 as shown in FIG. 29. Referring to FIG. 29, the fifth ceramic insulator 1102 includes a recess 1104 that has three regions 1106, 1108 and 1110 in a substantially IF shape. The recess 1104 is open at both end ends 1109 and 1111. Referring to FIG. 30, a third conductor 166 is disposed in the region 1108 of the recess 1104 of the fifth ceramic insulator 1102. In some embodiments, more than one conductors may be disposed in the region 1108 of the recess 1104. Referring to FIGS. 30 and 26, the portions 161 and 162 of the first conductor 150 and the second conductor 152 are disposed respectively in the region 1106 and the third region 1110 of the recess 1104 of the fifth ceramic insulator 1102 through the ends 1109 and 1111. After disposing the portions 161 and 162 into the recess 1104, the end portion 154 of the first conductor 150 is joined to an end portion 167 of the third conductor 166 to form the first conductor joint 1155 and the end portion 156 of the second conductor 152 is joined with an end portion 168 of the third conductor 166 to form the second conductor joint 1156. The joining may be performed using one or more ways as discussed with respect to FIGS. 6-11. Further, the method includes joining the first and second ceramic insulators 902 and 912 to the fifth ceramic insulator 1102 to form a first ceramic joint 970 and a second ceramic joint 972. These joining may be performed using one or more ways as discussed with respect to FIGS. 23-25. After performing the joining of the first conductor 150 and the second conductor 152 to the third conductor 166 and the joining of the first ceramic insulator 902 and the second ceramic insulator 912 to the fifth ceramic insulator 922, the first conductor 150, the second conductor 152 and the third conductor 166 are fully covered by the first, second and fifth ceramic insulators 902, 912, and 922

In some embodiments, the one or more articles 1000, 1001 and 1100 as shown in FIGS. 27, 28 and 30, may include one or more cooling channels. The one or more cooling channels may be defined by at least one ceramic insulator of the two or more ceramic insulators, at least one conductor of the two or more conductors, or their combinations as discussed previously with respect to one or more FIGS. 12-19.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. An article, comprising:
a ceramic insulator comprising an interior surface defining a recess, an insulator aperture in the interior surface, and an insulator cooling channel extending through at least a portion of the ceramic insulator to the insulator aperture; and
a first conductor at least partially disposed within the recess and comprising a first exterior surface, a first aperture in the first exterior surface, and a conductor cooling channel extending through at least a portion of the first conductor to the first aperture, with the first aperture fluidly coupled to the insulator aperture to define a cooling flow path extending through the article along the conductor cooling channel and the insulator cooling channel.

2. The article of claim 1, wherein the first conductor comprises a first end disposed within the recess.

3. The article of claim 2, wherein the first aperture is located at the first end.

4. The article of claim 2, wherein the first aperture is spaced from the first end.

5. The article of claim 2, further comprising a second conductor at least partially disposed within the recess adjacent the first conductor and having a second end.

6. The article of claim 5, wherein the first end of the first conductor is joined to the second end of the second conductor to form a conductive joint.

7. The article of claim 5, wherein the second end of the second conductor is joined to a side of the first conductor to form a conductive joint.

8. The article of claim 5, wherein the insulator cooling channel overlies the second conductor.

9. The article of claim 1, wherein the insulator cooling channel is unaligned with the conductor cooling channel.

10. A system comprising:
a stator comprising the article of claim 1; and a rotor, wherein the rotor is configured to rotate relative to the stator.

11. An article, comprising:
a ceramic insulator comprising an interior surface defining a recess, an insulator aperture in the interior surface, and an insulator cooling channel extending through at least a portion of the ceramic insulator to the insulator aperture;
a first conductor at least partially disposed within the recess;
a recess cooling channel defined by a gap formed between the interior surface and at least a portion of the first conductor;
wherein the insulator aperture is fluidly coupled to the gap to define a cooling flow path extending through the article along the recess cooling channel and the insulator cooling channel.

12. The article of claim 11, wherein the first conductor comprises a first end disposed within the recess.

13. The article of claim 12, wherein the insulator aperture is spaced from the first end.

14. The article of claim 12, further comprising a second conductor at least partially disposed within the recess adjacent the first conductor and having a second end.

15. The article of claim 14, wherein the first end of the first conductor is joined to the second end of the second conductor to form a conductive joint.

16. The article of claim 14, wherein the second end of the second conductor is joined to a side of the first conductor to form a conductive joint.

17. The article of claim 14, wherein the first conductor and the second conductor form an L-shaped arrangement.

18. The article of claim 14, wherein the insulator cooling channel overlies the second conductor.

19. The article of claim 12, wherein the first end of the first conductor is disposed within the recess and spaced from the gap.

20. A system comprising:
a stator comprising the article of claim 11; and
a rotor, wherein the rotor is configured to rotate relative to the stator.

* * * * *